United States Patent
Fereyre et al.

(10) Patent No.: US 10,313,566 B2
(45) Date of Patent: Jun. 4, 2019

(54) TIME DELAY INTEGRATION IMAGE CAPTURE METHOD CORRECTING IMAGE DEFECTS CAUSED BY COSMIC PARTICLES

(71) Applicant: E2V SEMICONDUCTORS, Saint Egreve (FR)

(72) Inventors: Pierre Fereyre, Voreppe (FR); Philippe Moenne-Loccoz, Grenoble (FR)

(73) Assignee: TELEDYNE E2V SEMICONDUCTORS SAS, Saint-Égrève (FR)

( * ) Notice: Subject to any disclaimer, the term of this patent is extended or adjusted under 35 U.S.C. 154(b) by 48 days.

(21) Appl. No.: 15/328,968

(22) PCT Filed: Jul. 23, 2015

(86) PCT No.: PCT/EP2015/066929
§ 371 (c)(1),
(2) Date: Jan. 25, 2017

(87) PCT Pub. No.: WO2016/016103
PCT Pub. Date: Feb. 4, 2016

(65) Prior Publication Data
US 2017/0230547 A1 Aug. 10, 2017

(30) Foreign Application Priority Data
Jul. 28, 2014 (FR) ...................... 14 57300

(51) Int. Cl.
*H04N 5/217* (2011.01)
*H04N 5/357* (2011.01)
*H04N 5/374* (2011.01)

(52) U.S. Cl.
CPC ........... *H04N 5/2173* (2013.01); *H04N 5/217* (2013.01); *H04N 5/357* (2013.01); *H04N 5/3743* (2013.01)

(58) Field of Classification Search
CPC ..... H04N 5/2173; H04N 5/3743; H04N 5/357
See application file for complete search history.

(56) References Cited

U.S. PATENT DOCUMENTS

| 6,593,562 B1 * | 7/2003 | Parrish | H01L 27/14609 250/208.1 |
| 2004/0051798 A1 * | 3/2004 | Kakarala | H04N 5/367 348/246 |

(Continued)

FOREIGN PATENT DOCUMENTS

| CN | 102881003 A | 1/2013 |
| EP | 1401196 A1 | 3/2004 |

(Continued)

OTHER PUBLICATIONS

A. Darryl Adams, Greg A. Johnson, Noel D. Jolivet, Jeff L. Metschuleit, "Optimizing scanning array performance using gain normalization and time delay and integrate pixel deselection during readout, hybrid, and focal-plane testing", Proc. SPIE 1686, Test and Evaluation of IR Detectors and Arrays II, (Jul. 1, 1992); doi: 10.1117/12.60539.*

(Continued)

*Primary Examiner* — Timothy J Henn
(74) *Attorney, Agent, or Firm* — Piloff & Passino LLP; Sean A. Passino; Rachel K. Pilloff (57) ABSTRACT

To eliminate image defects produced by high-energy particles passing through a time delay integration image sensor, upstream detection is effected on the digital values supplied by the pixels of the same rank that have successively observed the same scene point. This detection makes it possible to ignore or to correct values from corrupted pixels in establishing the digital signal representing the luminance of an observed scene point. Detection is based on the calculation of the difference between a first digital value $p_{i,a}(t_1)$ and a second digital value $p_{i,b}(t_2)$ supplied by two (Continued)

pixels $Px_{i,a}$ and $Px_{i,b}$ that have observed the same scene point, subtracting the second value from the first, and comparing it to a predetermined threshold k. If this difference is above the threshold, the first value is too high, the first value is ignored in the summation $\Sigma'_i$ effected to establish the luminance of the scene point, replacing this value with the second value to which it has been compared. Alternatively it is replaced by a mean value or excluded from the calculation.

14 Claims, 2 Drawing Sheets

(56) References Cited

U.S. PATENT DOCUMENTS

| | | |
|---|---|---|
| 2009/0238446 A1 | 9/2009 | Kataoka et al. |
| 2010/0188655 A1* | 7/2010 | Brown ............... G01N 21/9501 |
| | | 356/237.2 |
| 2013/0050553 A1 | 2/2013 | Bugnet et al. |

FOREIGN PATENT DOCUMENTS

| | | |
|---|---|---|
| JP | 2009216411 A | 9/2009 |
| WO | 2011138374 A1 | 11/2011 |

OTHER PUBLICATIONS

International Search Report for PCT/EP2015/088929, dated Oct. 1, 2015.

\* cited by examiner

TIME DELAY INTEGRATION IMAGE CAPTURE METHOD CORRECTING IMAGE DEFECTS CAUSED BY COSMIC PARTICLES

FIELD

The invention concerns a time delay integration and digital summation image capture method and a corresponding sensor.

TECHNICAL CONTEXT

Linear time delay integration (TDI) sensors are used for example on earth observation satellites, for industrial monitoring and for medical applications (dental panoramic radiography, mammography).

A TDI sensor comprises N parallel lines of photosensitive pixels, where N is at least equal to 2, that successively observe the same strip of a scene that moves in front of the sensor, perpendicularly to the photosensitive lines. The image of the observed scene strip is then reconstituted by addition of the images successively captured by each of the photosensitive lines. This addition is effected point by point for each point of the observed scene strip.

Of more particular interest are TDI sensors with transistorized active pixels. Their pixels are formed of a photosensitive element connected to a capacitive storage node and transistors for sequencing the various pixel control phases. In particular, at the time of selection of a pixel for reading, a voltage corresponding to the quantity of charge that has accumulated at a capacitive storage node of the pixel is applied to a column conductor connected to a reading circuit. This voltage level represents the quantity of light received by the pixel.

The reading circuit applies this level to the input of an analogue to digital converter. The converter is a ramp converter, for example, which comprises a comparator for comparing the voltage level to be converted to a linear voltage ramp and a counter that counts at a high frequency from the start time of the ramp until the comparator changes state. The content of the counter at the time of changing state represents a digital value of the voltage level to be converted. This value represents a measurement of the luminance received by the pixel. Means are generally used to enhance the signal to noise ratio of this measurement, notably employing digital or analogue techniques to subtract a signal representing an initialization level of the storage node of the pixel.

When the sensor comprises N photosensitive lines of P pixels, for each column of pixels and for each integration period the N pixels are successively connected to a common column conductor and the reading circuit supplies N successive digital values each representing the luminance received by the corresponding pixel.

To make an active pixel TDI sensor, it still remains to sum the digital values obtained from the N pixels but corresponding to N successive observations of the same scene point, i.e. each obtained over one integration period of a set of N successive integration periods. In practice it is a digital processor circuit that effects this summation synchronously with the speed of movement of the sensor, over N successive integration periods, for each point of an observed scene strip. There are produced as output the P digital values representing the measured luminance for each point of the observed scene strip.

One such active pixel TDI sensor is described in the applicant's application WO 2011/138374, for example.

TECHNICAL PROBLEM

The images produced by the image sensors may show light spots that come not from the observed image but from the energy deposited by virtue of the ionizing effect of cosmic particles.

These cosmic particles, of solar or extragalactic origin, have the particular feature of having a very high energy, of the order of a giga-electron-volt, and a very small mass, which makes it possible for them to pass through electronic equipment, creating as they go a certain number of electrical charges, i.e. electron-hole pairs.

In an image sensor, if such a particle passes through the photosensitive area of a pixel, the electrical charges created by this particle will be captured by the photosensitive element and interpreted as photons, having the effect of being reflected in the captured image by a spot creating false information in the image. This spot may appear as a larger or smaller and more or less bright point. This spot can therefore form a streak across the lines if a plurality of pixels of the sensor are affected by the same particle, depending on the angle of incidence of that particle. For a pixel affected by such a particle, the corresponding effect is not remanent: it remains only for the time for the charges generated by the particle to be captured by the photosensitive element. As for the level of brightness of the spot left on the image, it depends on the brightness of the background of the observed scene itself, the energy and type of particle, its angle of incidence on the sensor, the geometry of the pixel, etc.

While traces of the passage of cosmic particles are found in the images produced by video cameras used in space, they are also found in the images produced by video cameras used on the ground. In this case, the particles in question are generally muons, produced by disintegration of larger cosmic particles on passing through the atmosphere.

Consider by way of example the images supplied by image sensors used on the ground in AOI (Automated Optical inspection) systems used in industry by the manufacturers of electronic components as they leave the production line (production checking).

It will generally not be easy to distinguish in a production checking image a "true" defect in a component from a "false" defect caused by a collision with a cosmic particle. The traces could be wrongly interpreted as true defects, leading to unnecessarily returning the component for repair followed by returning it for checking, etc. Over a period of around ten hours, there can therefore be around ten traces caused by such particles, and therefore around ten unnecessary returns. It is therefore the gain in productivity that is degraded. This degradation is worse in geographical areas in which the streams of cosmic particles are more dense.

The technical problem addressed by this invention is therefore detecting, in order to eliminate them, traces in the captured image corresponding to false information produced by collisions with high-energy particles.

SUMMARY

The invention proposes a technical solution enabling, in a TDI sensor, detection of these false events produced by high-energy particles colliding with the sensor and elimination thereof.

This solution is based on:
the random and rare nature of these particles; in particular it is statistically relatively improbable that two particles come into collision with the sensor at the same time; in other words, few pixels are affected at the same time; it is even less probable that two adjacent pixels of the same rank are successively corrupted by two different cosmic particles, the first over one integration period and the other over the next integration period;
their non-remanent effect: if a particle passes through the photosensitive area of a pixel at a given time, the visible effect of this particle is "seen" over only one integration period, during which the photosensitive element will capture the electric charges generated by the particle; this effect disappears on resetting to zero the storage node of the pixel for the next integration period;
the luminance differential produced on the pixel effected, leading, because of the surplus of electrical charges induced, to a much higher digital value than the digital value normally expected (the situation is of course that in which this expected value is far from saturation—otherwise the passage of the particle will be "painless").

The basic idea of the invention is to calculate the difference between first and second digital values supplied by two pixels that have observed the same scene point, subtracting the second value from the first, and comparing it to a predetermined threshold. If this difference is above the threshold, the first value is too high: it reflects the effect of the passage of a cosmic particle. In this case, the first value is ignored in the summation effected to establish the luminance of the scene point. This value may be ignored in various ways: by correcting it, i.e. by replacing this value with the value to which it has been compared or a mean value, or by excluding it from the calculation.

In this way the image defects produced by high-energy particles passing through the sensor are eliminated. This is achieved without degrading the signal to noise ratio at the output or the demodulation transfer function of the system (contrast, resolution), because the method in accordance with the invention does not apply filtering to the output signal, but upstream detection the only effect of which is to ignore or to correct the values from corrupted pixels.

The invention therefore concerns a time delay integration scene image capture method, for the synchronized reading of the same scene strip successively by at least two lines of P photosensitive pixels of an image sensor and pixel by pixel summation of the signals read by the various lines.

According to the invention:
the signals from the pixels of the various lines are digitized, establishing digital values which for the pixels of the same rank in the various lines of the sensor each represent the luminance of the same scene point,
a difference is calculated between a first digital value from a first pixel of a line of the sensor and a second digital value from the pixel or pixels of the same rank of at least one other line of the sensor,
the result of the subtraction is compared to a threshold,
if the result is below the threshold, the first digital value is considered acceptable and the digital values from the pixels of the same rank of the various lines of the sensor are added to supply a third digital value representing the luminance of the scene point,
if the result is above the threshold, the first digital value is considered unacceptable and a fourth digital value not taking into account the first digital value in the addition of the digital values from the pixels of the same rank of the various lines is established to represent the luminance of the scene point.

The second digital value may be the digital value supplied by a second pixel (preferably an adjacent pixel of the same rank). If the first value proves unacceptable, then the first value can be replaced by the second one in the digital addition. The comparison between two pixels can be effected by comparing the absolute value of the difference to a threshold so as thereafter to replace the sum of the values of the two pixels with twice the lower value of the two.

The difference may be established and compared to a threshold in succession for the various pairs of two lines if the sensor has more than two lines.

Moreover, if the sensor includes more than two lines, and more particularly if it includes many more than two lines (10 to 20 or more) it may be preferable to replace the first value with a mean value, preferably excluding this first value.

It may yet be preferred to compare the first value not to a value supplied by another line but to the average value of the values supplied by the other lines, or even the mean value of all the lines, given that the mean has little chance of being significantly affected by a cosmic particle in theory affecting only one line.

If the first value proves unacceptable, it is then replaced by the mean value in the addition of the N values to establish the fourth digital value representing the luminance of the scene point.

It may yet be replaced by a null value, which then amounts to pure and simple exclusion of the doubtful value. The fourth value is then established by the result of the digital addition of the N digital values obtained from the N pixels of the same rank, multiplied by the coefficient N/N-r, if r first values have been judged doubtful and replaced by a null value (r less than N).

The invention also concerns a sensor specifically adapted to implement this method. This sensor is a time delay integration scene image sensor enabling the synchronized reading of the same scene strip successively by at least two lines of P photosensitive pixels and pixel by pixel summation of the signals read by the various lines, including a signal for digitizing the signal supplied by each pixel, and a digital processor circuit configured to add the digital values from the pixels of the same rank belonging to the various lines and having viewed the same scene point, the result of the addition supplied as output representing the luminance of the scene point, characterized in that the digital processor circuit is configured to
effect a subtraction between a first digital value of the signal obtained from a first pixel, representing the luminance of a scene point, and a second digital value from the pixel or pixels of the same rank of at least one other line, and representing the luminance of the same scene point,
compare the result of the subtraction to a threshold,
modify the digital addition and supply by way of a substitute another digital sum not taking into account the first digital value in the case where the result of the subtraction exceeds the threshold.

Other features and advantages of the invention are explained in the following description of embodiments of an image capture method in accordance with the invention and with the aid of the appended drawings.

DETAILED DESCRIPTION

The invention is explained first for the situation of a bilinear TDI sensor, i.e. one comprising two photosensitive lines, in front of which moves a scene strip to be observed.

Figure 1:
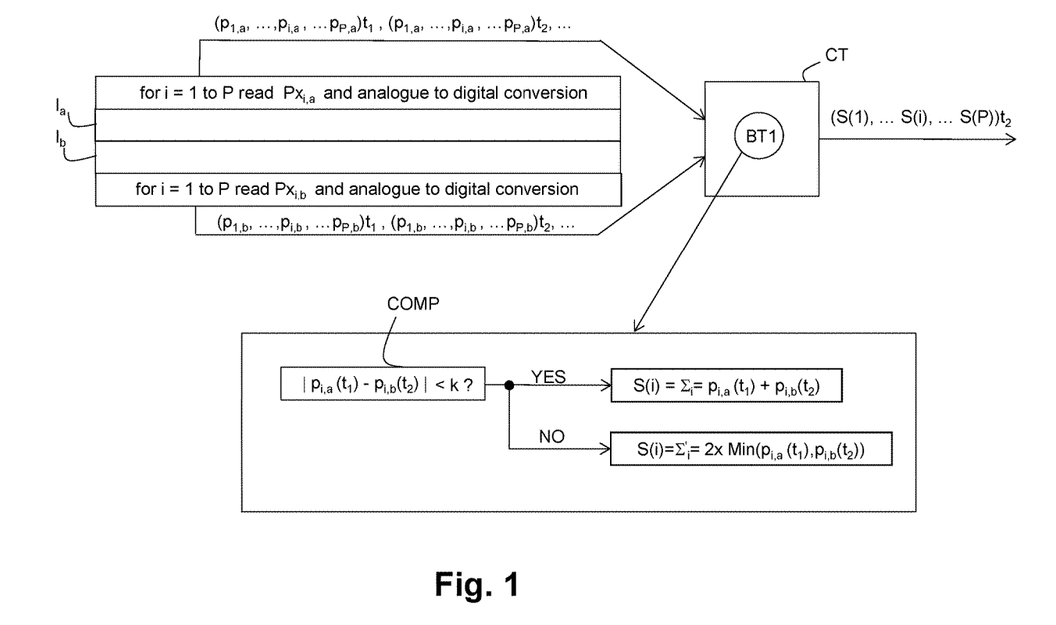
FIG. 1 shows a TDI image capture method in accordance with the invention applied to a bilinear TDI sensor, i.e. one comprising two parallel lines of photosensitive pixels.

FIG. 1 shows the method in accordance with the invention.

The sensor comprises two photosensitive lines $I_a$ and $I_b$, each comprising P pixels of rank 1, 2, ... i, ... P.

Consider a scene strip observed successively by the line $I_a$, then by the line $I_b$, in the direction of and at the speed of movement of the sensor.

For each line, and for each integration period, a reading and analogue to digital conversion circuit of the sensor supplies as output to a digital processor circuit CT a stream of P digital values supplied by the pixels of the line. This circuit effects the pixel by pixel summation for each of the P points of a scene strip observed successively by the line $I_a$, over an integration period, for example the period $\Delta_1 = t_1 - t_0$, and the line $I_b$, over the next integration period, in this example $\Delta_2 = t_2 - t_1$.

Consider a scene point successively observed by the pixels $Px_{i,a}$ and $Px_{i,b}$ of rank i of the lines $I_a$ and $I_b$ of the sensor.

The digital value supplied at the time $t_1$ by the pixel $Px_{i,a}$ of the line $I_a$, denoted $p_{i,a}(t_1)$, corresponds to the quantity of light received by this pixel during the integration period $\Delta_1$ for this scene point and the digital value supplied at the time $t_2$ by the pixel $Px_{i,b}$ of the line $I_b$, denoted $p_{i,b}(t_2)$, corresponds to the quantity of light received by this pixel for the same scene point during the next integration period $\Delta_2$.

For each scene point, the processor circuit CT receives the corresponding two values $p_{i,a}(t_1)$ and $p_{i,b}(t_2)$ and calculates their sum $\Sigma_i = p_{i,a}(t_1) + p_{i,b}(t_2)$, which represents the luminance of the scene point concerned.

The processor circuit performs this calculation for each of the P scene points of the line observed to supply as output the P luminance signals S(i) i=1 to P and does so for each scene strip observed by the sensor, the reading and analogue to digital conversion and digital processor circuits being controlled synchronously with the speed of movement of the sensor by a sequencer that is not shown.

Notwithstanding noise and the non-uniform response of the sensor, there should be obtained from the two pixels $Px_{i,a}$ and $Px_{i,b}$, two identical digital values $p_{i,a}(t_1)$ and $p_{i,b}(t_2)$.

However, if the pixel $Px_{i,a}$ has been affected by a high-energy particle, before or during capture by the photosensitive element of the pixel over the integration period $\Delta_i$, the digital value $p_{i,a}(t_1)$ supplied at the time $t_1$ by this pixel is corrupted whereas there is normally a very high probability that the digital value $p_{i,b}(t_2)$ supplied by the pixel $Px_{i,b}$ at the time $t_2$ will not be corrupted.

Also, if the observed scene point does not have a luminance such that the photosensitive element of the pixels $Px_{i,a}$ and $Px_{i,b}$ can become saturated, the corrupted value $p_{i,a}(t_1)$ will be much greater than the value $p_{i,b}(t_2)$.

It is therefore possible by calculating the difference between these two values $p_{i,a}(t_1)$ and $p_{i,b}(t_2)$ to detect a pixel corrupted by a collision with a high-energy particle by comparing this difference to a threshold k before establishing the output value S(i) representing the luminance for the scene point concerned. This threshold k is set to a digital value greater than the reading noise level, which depends on the technology of the sensor and the application.

In the method in accordance with the invention it is therefore a question of looking to see if:

the difference $p_{i,a}(t_1) - p_{i,b}(t_2)$ is above a predetermined threshold k. If so, the first pixel has been corrupted over the integration period $\Delta_1$.

the difference $p_{i,b}(t_2) - p_{i,a}(t_1)$ is above the predetermined threshold k. If so, the second pixel has been corrupted over the integration period $\Delta_2$.

if the difference is below the threshold k in both cases, the decision is taken that neither of the two pixels has been corrupted over the corresponding integration period, on the realistic assumption that the two pixels cannot have both been corrupted, the first over $\Delta_1$, and the second over $\Delta_2$. In this case, the output signal S(i) supplied by the processor circuit is established by the usual calculation of the sum $\Sigma_i$ of the two digital values $p_{i,a}(t_1)$ and $p_{i,b}(t_2)$ supplied by the two pixels.

If one of the two pixels has been corrupted over the corresponding integration period, the digital value obtained from this pixel is not taken into account in the production of the output signal S(i): either it is ignored (and the fact that it is ignored is taken into account in the numeric summation) or it is replaced by a more appropriate value.

In accordance with one implementation of the invention, the digital value from the corrupted pixel, which is therefore too high, is replaced by the digital value from the other pixel. The output signal S(i) of the processor circuit is then established by the calculation of a corrected sum $\Sigma'_i$. In the example where it is the pixel $Px_{i,a}$ that has been affected, this sum $\Sigma'_i$ is equal to: $\Sigma'_i = 2 \cdot p_{i,b}(t_2)$. In other words, the digital value $\Sigma_i$ obtained by the summation of the two digital values supplied by the two pixels is replaced by a digital value $\Sigma'_i$ corresponding to a sum that does not take into account the value that is too high.

To summarize, the invention proposes to compare the digital values from two pixels of the same rank observing the same scene point but over different integration periods of the sensor. If by convention the expression "first digital value" refers to the higher of the two digital values, for example $P_{a,i}(t_1)$, and "second digital value" refers to the lower of the two values, the difference between the first and second values is calculated, this difference is compared to a threshold k (assumed positive, since it is a question of noting an excessive signal level caused by a particle); if the difference is below the threshold, the luminance of the scene point is established by a third digital value $\Sigma_i$ that is the classic sum $\Sigma_i$ of the values from the pixels that have viewed the same scene point; if on the other hand the difference is above the threshold, the first value is set aside and in place of the third value a fourth digital value $\Sigma'_i$ is established to represent the luminance of the scene point, which does not take into account the unacceptable first value, and which in the example that has just been described consists in twice the second value.

In practice, there is not necessarily any attempt to detect which of the two pixels is corrupted, but rather to correct the effect of corruption.

The absolute value of the difference between the two digital values can then be compared to the threshold k. If it is above the threshold k, the higher of the two digital values must be replaced by the lower of the two values. Note that the expression "above" the threshold may mean that the difference is greater than this value k or that it is greater than or equal to this value k. This is a choice arrived at by convention at the time of practical implementation for a given sensor and a given application.

A test and addition loop BT1 applied to produce for each of the P scene points of an observed line the output signal S(i) with i=1 to P may then be written:

(BT1): for i=1 to P, if $|P_{i,a}(t_1)-P_{i,b}(t_2)|<k$

Then $S(i)=\Sigma_i P_{i,a}(t_1)+P_{i,b}(t_2)$

Else $S(i)=\Sigma'_i 2\times \text{Min}\,[P_{i,b}(t_2),P_{i,a}(t_1)]$

This loop is in practice implemented by the digital processor circuit CT, as shown diagrammatically in FIG. 1. It can easily be implemented in an FPGA type programmable circuit. This processor circuit may be integrated into the sensor itself or placed outside the sensor, in the optical system utilizing the sensor, for example in the video camera.

This circuit CT receives the streams of digital values $\{(p_{i,a}) i=1,P\}$ and $\{(P_{i,b}) i=1,P\}$ from each photosensitive line as and when they are supplied by the reading and digitization circuit for the current integration period. It stores this data temporarily for the digital processing that will be effected over the next integration period to calculate the luminance of each of the points of the corresponding scene strip.

For each scene point, the circuit CT applies the test and addition loop BT1 to the two digital values supplied by the two pixels of the same rank of the sensor that have viewed this same scene point, the first value supplied at the time $t_1$ and the second value supplied at the time $t_2$.

A practical implementation of the test and addition loop BT1 for each of the P points of a scene strip may be as follows: the test circuit recovers the first and second digital values from the two pixels of the same rank that have observed the same scene point; the absolute value of the difference between the first and second values is calculated; the test COMP of comparison with the threshold k is effected. If the comparison test is negative, the third digital value $\Sigma_i$ is calculated equal to the sum of the two digital values supplied by the two pixels and it is this value $\Sigma_i$ that is supplied as output S(i); if the comparison test is positive, the fourth digital value $\Sigma'_i$ is calculated providing a result that does not take the corrupted value into account, in this example equal to twice the lower of the two values. It is this value $\Sigma'_i$ that is transmitted as output S(i).

The normal value $\Sigma_i$ may also be calculated systematically and the test loop BT1 executed in parallel with this. In this case, the result of the test validates the transmission of one value ($\Sigma_i$) or the other ($\Sigma'_i$) as output (S(i)).

In this simple example of a bilinear TDI sensor, it is demonstrated that it is therefore possible, through discrimination, to detect the effect on a pixel of a collision with a high-energy particle during an integration period and to eliminate it by ignoring the corresponding digital value in the calculation of the luminance of the scene point observed by this pixel over this period.

Thus the method advantageously exploits the fact that the digital value from each of the pixels is available. It therefore applies generally to all TDI sensors in which the signal from each pixel is digitized. It therefore applies notably to active pixel TDI sensors.

The method may be generalized to TDI sensors including N lines of photosensitive pixels, where N is greater than or equal to two.

In this case, for each point of an observed scene strip, it is a question of detecting if there are one or more corrupted values in the N digital values supplied by the N pixels that have successively observed the same scene point of this strip over N successive integration periods $\Delta_1=t_1-t_0$, $\Delta_2=t_2-t_1$, ... $\Delta_{N-1}=t_{N-1}-t_{N-2}$, $\Delta_N=t_N-t_{N-1}$.

For each scene point, a test loop in accordance with the invention may be applied to test the N digital values supplied by the N pixels of the same rank of the N lines of the sensor that have successively observed this scene point.

In the known manner, these N values are obtained successively, the first $p_{i,1}(t_1)$ at a time $t_1$ from the pixel $Px_{i,1}$ of rank i of the first line, the second $p_{i,2}(t_2)$ at a time $t_2$ from the pixel $Px_{i,2}$ of rank i of the second line, ..., the Nth $p_{i,N}(t_N)$ at a time $t_N$ from the pixel $Px_{i,N}$ of rank i of the Nth line.

Various test algorithms may be envisaged for establishing the luminance of each of the P points of a scene strip observed by the N photosensitive lines of the sensor, a number of options being feasible both for the test and for the correction. Various examples are given hereinafter considering a scene point of rank i (i=1 to P), and the N digital values $P_{i,1}$, $P_{i,2}$, ..., $P_{i,N}$ obtained for this point by the N pixels $Px_{i,j}$ of rank i of the sensor at times $t_1$, $t_2$, ..., $t_N$.

The general principle of the test loop in accordance with the invention applied to a multilinear sensor is to determine for each of the N values $p_{i,j}$ that represent a luminance of the same scene point of rank i of a given observed strip, whether it is acceptable or not, and in the latter case to ignore it or to correct it in the calculation of the luminance S(i) of the scene point concerned.

For each of the N values, it is therefore a question of effecting a subtraction between this value, referred to by convention as the "first digital value", and a second digital value from a pixel or pixels of the same rank of at least one other line of the sensor and representing a luminance of the same scene point and an operation of comparison to a threshold k.

Depending on the result of the comparison, the output signal S(i) representing the luminance of the scene point concerned is given by:
 a value referred to by convention as the "third digital value", which is equal to the sum $\Sigma_i$ of the N digital values $p_{i,j}$ supplied by the pixels, if no error has been detected; or
 a value referred to by convention as the "fourth digital value", equal to a value $\Sigma'_i$ calculated ignoring or correcting the values detected as corrupted.

In a first algorithm example, the second digital value is the value supplied by a pixel of the same rank. In this example, the N digital values are compared two by two for pairs of lines.

This two by two comparison is preferably effected for pairs of adjacent lines. Each of the N digital values $p_{i,j}$ is therefore compared with the next digital value $p_{i,j+1}$ supplied by the pixel of the next same rank i of the next (adjacent) line. If the result of the comparison is that it is too high, the value $p_{i,j}$ is replaced by the next digital value $p_{i,j+1}$.

This implicitly assumes that the test on the digital value $p_{i,j}$ acquired by the pixel $Px_{i,j}$ is carried out when there is available at least the digital value $p_{i,j+1}$ acquired by the next adjacent pixel $Px_{i,j+1}$ of the same rank (in the next line). Given this condition, the test can therefore be conducted as digital values are acquired relating to the luminance of same scene point, at the timing defined by the integration periods; note that this test could also be conducted when the N digital values are available relating to the luminance of the scene point concerned, so that the order of their acquisition of little importance.

Consider the case of a test loop applied as and when digital values representative of the luminance of the same scene point are acquired.

The pixel $Px_{i,1}$ of the first line $I_1$ of the sensor observes the ith point of a scene strip during the period $\Delta_1=(t_1-t_0)$. It supplies a digital value $p_{i,2}$ at the time $t_1$ representing the luminance of this scene point.

The pixel $Px_{i,2}$ of the first line $I_2$ of the sensor observes this ith scene point during the next period $\Delta_2=(t_2-t_1)$. It supplies a digital value $p_{i,2}$ at the time $t_2$ representing the luminance of the same scene point, which value is stored.

At the time $t_2$, it will be possible to calculate the difference between this previously acquired value $p_{i,1}$ and the current value $p_{i,2}$ supplied by the pixel $Px_{i,2}$ and to compare this difference (or the absolute value of this difference) to a threshold k.

And so on, up to the time $t_N$ at which the Nth value $p_{i,N}$ for this scene point is acquired. The comparison of the value $p_{i,N-1}$ acquired in the preceding period could be used for this Nth and final value $p_{i,N}$.

For example, a corresponding test loop BT2 may be written:

(BT2):

For $j=1$ to $N$, if $p_{i,j}-p_{i,j+1}<k$, then $p_{i,j}$.

Else $p_{i,j}=p_{i,j+1}$.

On exit from the test loop, there is supplied as the output signal S(i) representing the luminance of the scene point concerned:

the third digital value that is the sum $\Sigma_i$ of the N digital values $p_{i,j}$ supplied by the pixels and all considered acceptable; or a fourth digital value $\Sigma'_i$ taking into account in the calculation of this sum the replacement value or values for the value or values deemed unacceptable.

In the case of a test loop applied at the time of reading and digitizing the Nth line of the sensor at the time $t_N$, i.e. when all the N values corresponding to the same scene point are available, the test loop may be applied to the digital values taken two by two whatever the order of reading them. By "available values" is meant the values that have already been acquired and stored at least for the processing time and the values that are in the process of being supplied by the circuit for reading and digitizing the pixels of the sensor.

At the end of the Nth integration period, the N values for the ith scene point concerned will have been tested. The test circuit can then supply as output the luminance value S(i) for this scene point, which will be equal to the third value $\Sigma_i$ or the fourth value $\Sigma'_i$, according to whether the test loop has not found unacceptable values or has found at least one of these. In the above example of the test loop BT2, this loop then supplies the replacement value or values for the calculation of the value $\Sigma'_i$.

A practical implementation may be as follows: the test loop BT2 is executed. At the end of each iteration of the loop, the test loop transmits the digital value $p_{i,j}$ tested or its corrected value $p_{i,j+1}$, depending on the result of the comparison test, to an accumulator register of the processor circuit. At the end of the loop, the accumulator register contains the result of the summation of the N digital values, corrected if necessary. It is this result that forms the output value S(i) for the image point concerned. The register contains N summation stages corresponding to the N acquisition lines of the imaging device.

The third and fourth values may also be calculated in parallel, as the acquisitions and tests proceed. At the end of the Nth iteration of the test loop, a selector makes it possible to select which value (either the third or the fourth) must be transmitted as output S(i).

It has been shown that it would be equally possible to apply the comparison with the threshold k to the absolute value of the difference, as described above for the test loop BT1 applied to a bilinear sensor. Pairs of values are then preferably tested, preferably corresponding to pairs of adjacent lines. The N/2 pairs of values will therefore be tested: $(p_{i,1}, p_{i,2})$, $(p_{i,3}, p_{i,4})$, ... $(p_{i,N-1}, p_{i,N})$, assuming N is even. This algorithm based on the comparison of the absolute value of the difference to a threshold makes it possible to halve the number of comparisons to be effected. It is also possible, following the test of comparison to the threshold, to calculate an intermediate result equal to the sum of the two values, if the test is negative, or equal to twice the smaller value, if the test is positive (FIG. 1). When the N/2 pairs of values have been tested, the final result is then obtained by calculating the sum of the N/2 intermediate results, in which any corrupted values will therefore not be taken into account. In this case, it is the intermediate results that will be successively accumulated in an accumulator register.

In another algorithm example applicable when all the N values corresponding to the same scene point are available, it is then also possible to compare each of the N values to the mean of the N values or preferably to the mean of the N−1 other values, i.e. excluding the digital value tested.

If the result of the subtraction were to be greater than or equal to the predetermined threshold, the digital value tested is replaced by this calculated mean value.

Whether to exclude the digital value that is tested or not in the calculation of the mean value typically depends on the number N of photosensitive lines.

If this number is sufficiently large, for example equal to 32, 64 or more, the mean value calculated over the N digital values is virtually unchanged, whether the digital value being tested is corrupted or not. In this case, for each scene point, the mean value of the N digital values is calculated. This can typically be done using N accumulator registers that successively receive the N digital values at the end of the N successive integration periods, and this mean value is supplied to the test loop.

If N is smaller, for example equal to 10 or 20, the tested value should preferably be excluded from the calculation of the mean, because according to whether it is corrupted or not the mean value calculated will be notably different and the detection test rendered less effective or even ineffective.

To summarize, for a sensor with N photosensitive lines, a capture method in accordance with the invention makes it possible to test the N values supplied by the N pixels of the same rank for a given scene point before establishing the luminance thereof.

By convention the "first digital value" is the value to be tested; a "second digital value" is subtracted from it which may be a value from another pixel of the same rank or a mean value Vm possibly excluding the first digital value, and the difference is compared to the threshold k.

If the difference is above the threshold, the tested value, deemed unacceptable, is replaced with another value, which may be the second digital value, i.e. the value from the other pixel, or the mean value Vm.

Even if the second digital value subtracted is a value supplied by another pixel of the same rank, it may be preferable to take a mean value as the replacement value.

Finally, whether the first digital value is tested by comparison with another of the N digital values or by comparison with a mean value, if this first value is deemed unacceptable, it is also possible to choose to replace the first value with a null value for the calculation of the corrected sum. In this case the luminance of the scene point is given by the result of the corrected sum $\Sigma'_i$ multiplied by a coefficient N/N-1. This is true if only one of the N values is corrupted. If r values of the N values supplied by the pixels are deemed corrupted and replaced by the null value, the multiplication coefficient will be N/N-r. This variant is of interest provided that r is small compared to N.

The invention that has just been described applies to any time delay integration linear image sensor with N lines of P photosensitive pixels, where N is greater than or equal to 2, in which for each point of the scene strip observed each of the N signals supplied by the N pixels of the same rank is digitized.

Figure 2:
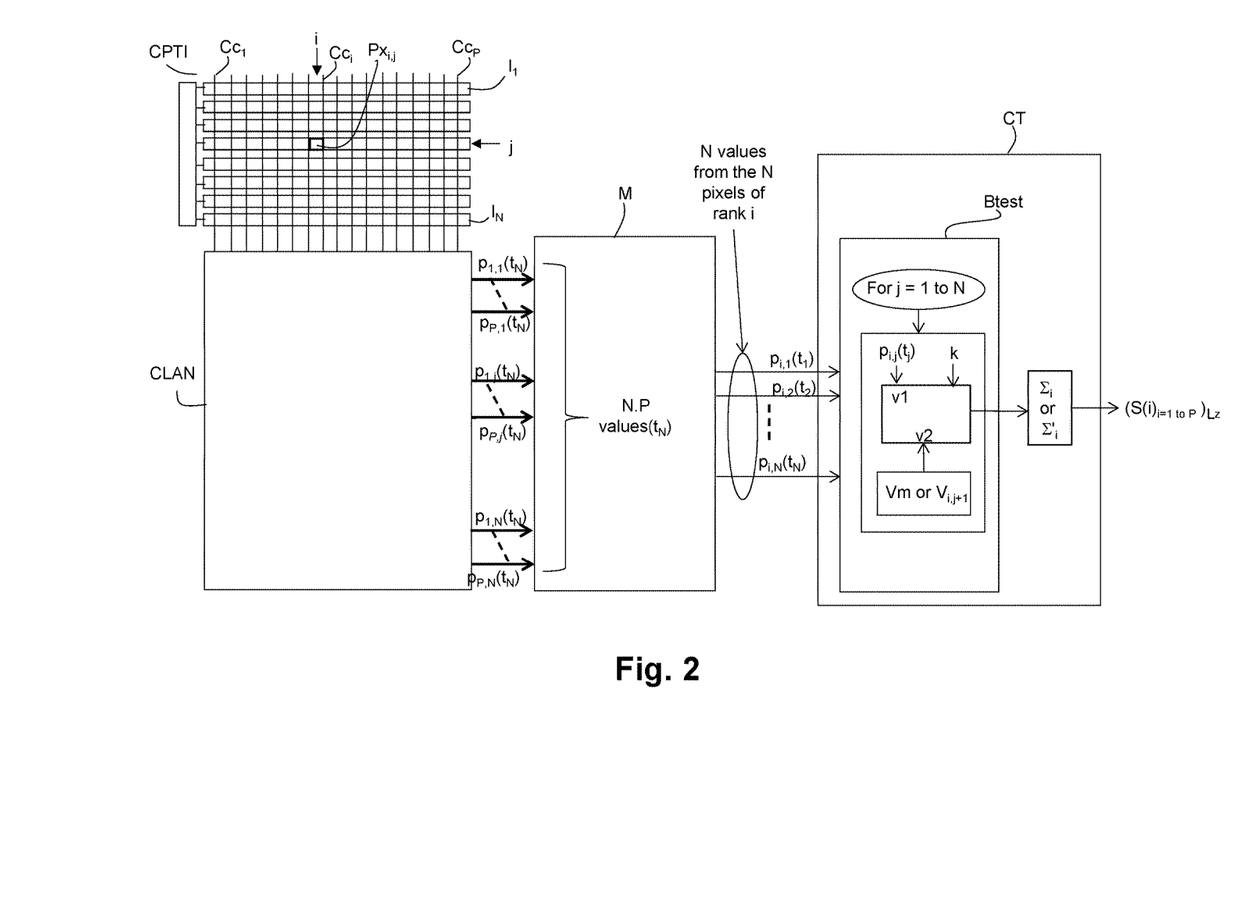
FIG. 2 is a simplified block diagram of a time delay integration image sensor with N photosensitive lines of P pixels, where N is an integer greater than or equal to 2, using a method in accordance with the invention.

FIG. 2 shows a theoretical diagram of a sensor CPTI comprising N lines of P photosensitive elements $Px_{i,j}$, i=1 to P, j=1 to N, implementing the invention. The sensor includes a circuit CLAN for reading pixels and analogue to digital conversion supplying as output and in sequence the N.P digital values supplied by the N.P pixels of the sensor at the end of each integration period. These values are stored in memory M and processed by a digital processor circuit CT applying a test loop Btest according to the invention to supply in sequence as output the P luminance digital signals S(i) of the P points of each observed strip Lz, calculated by setting aside or correcting aberrant values linked to cosmic particle impacts.

In the conventional manner, in this sensor, the pixels of the same rank i of the sensor that are successively selected in read mode each successively applies a voltage signal corresponding to the quantity of charge accumulated to the same column conductor $Cc_i$, synchronously with the movement of the observed scene. The reading and digitization circuit CLAN reads the voltage signal applied to the column conductor $Cc_i$ by the pixel selected for reading and applies it to an analogue to digital converter which supplies a digital value for it that is stored in memory M. This converter may be specific to each column or common to all the columns.

At the end of each integration period, for example at a time $t_N$ after the Nth period: P digital values are collected per line $I_j$ of the sensor, i.e. N.P digital values corresponding to N scene strips each observed by a line of the sensor. In this example the circuit CLAN supplies as output the P values $p_{1,1}(t_N), \ldots, p_{P,1}(t_N)$ supplied by each of the N lines $I_j$: $p_{1,1}(t_N) \ldots, p_{P,1}(t_N), \ldots, p_{1,j}(t_N), \ldots p_{P,j}(t_N)$, $p_{1,N}(t_N), \ldots p_{P,N}(t_N)$. It therefore supplies N.P digital values that are stored in memory M and transmitted to the digital processor circuit CT. These reading, conversion, storage and transmission operations are rendered synchronous with the speed of movement of the sensor, by a sequencer that is not shown.

Consider a time $t_N$, after at least N successive integration periods of the sensor $\Delta_1 = t_1-t_0, \Delta_2=t_2-t_1, \ldots \Delta_N=t_N-t_{N-1}$ of a given scene strip Lz: at the time $t_N$ the memory M then contains for each of the P points of this scene strip the N digital values supplied by the N pixels of the same rank of the sensor for this scene point over N successive integration periods, which represent the luminance of this scene point. For example, as shown, the memory M therefore supplies the N values $pi_{,1}(t_1), p_{i,2}(t_2), \ldots p_{i,N}(t_N)$ for the scene point of rank i.

In practice, and as described in detail above, these values may be supplied as and when acquired or when the N values are in fact available.

The digital processor circuit and the memory may in practice be integrated into the sensor itself, or be located outside the sensor, in the optical system utilizing the sensor, for example in the video camera. They will generally be implemented by an FPGA type circuit.

For a given scene strip Lz, the processor circuit may be sequenced to test the N values obtained for each of the P points of an observed strip Lz.

In practice the test loop is executed in parallel for the P scene points, each of the P test loops receiving the N values supplied by the pixels to be tested.

The test loop may be executed as and when the N values are acquired, as soon as the first two are available, or when all the N digital values per scene point of the strip Lz are available. This latter variant is more particularly used when the test loop effects a comparison with a mean value Vm that is calculated over the N values or N-1 other values excluding the value that is being tested.

In practice, the test circuit and the calculator circuit of the processor circuit CT may be fed with the digital values supplied directly by the converter circuit CLAN for the current integration period and by the memory M for the others, in accordance with an appropriate sequence.

The digital processor circuit CT is typically adapted to calculate the value $\Sigma_i$ or a value $\Sigma'_i$ corrected in accordance with the invention, as a function of the output of the test loop Btest.

The practical implementation of these calculation and test circuits and their sequencing involve no particular difficulties of implementation for the person skilled in the art. It uses the usual digital calculation and test means or mechanisms, implemented in or by the digital processor circuit, and integrates into the usual sequencing steps for acquiring and storing the N.P digital values in each integration period of the sensor and supplying the digital values to the processor circuit to obtain as output the streams of luminance values calculated for each observed scene strip, synchronously with the speed of movement of the scene in front of the photosensitive lines of the sensor.

The invention claimed is:

1. A method for capturing one or more images of a scene with an active pixel time delay integration image sensor enabling the synchronized reading of the same scene strip successively by at least two lines of photosensitive pixels of the image sensor and pixel by pixel summation of the signals read by the various lines, wherein
    the signals from the pixels of the various lines are digitized, establishing digital values which for the pixels of the same rank in the various lines of the sensor each represent the luminance of the same scene point,
    a difference is calculated between a first digital value from a first pixel of a line of the sensor and a second digital value from the pixel or pixels of the same rank of at least one other line of the sensor,
    a result of the calculation is compared to a threshold,
    if the result is below the threshold, the first digital value is considered acceptable and the digital values from the pixels of the same rank of the various lines of the sensor are added to supply a third digital value representing the luminance of the scene point, and
    if the result is above the threshold, the first digital value is considered unacceptable and a fourth digital value not taking into account the first digital value in the addition of the digital values from the pixels of the same rank of the various lines is established to represent the luminance of the scene point.

2. The method of claim 1, wherein the sensor comprises N lines with N at least equal to 2 and the second digital value is the digital value supplied by a second pixel of the same rank of another line of the N lines of pixels.

3. The method of claim 2, wherein the fourth digital value is obtained by replacing the first digital value by the second digital value in the addition of the N digital values from the pixels of the same rank of the N lines of the sensor.

4. The method of claim 2, wherein the fourth value is obtained by replacing the first digital value with a mean value in the addition of the N digital values from the pixels of the same rank of the N lines of the sensor, said mean value being a mean value of the digital values from the pixels of the same rank excluding the first digital value.

5. The method of claim 2, wherein the first and second digital values are digital values supplied by two pixels of the same rank belonging to two adjacent lines of pixels.

6. The method of claim 2, wherein the result of the calculation is an absolute value of the difference between the first digital value and the second digital value.

7. The method of claim 2, wherein the fourth value is equal to the sum of the N digital values from the N pixels of the same rank of the N lines of the sensor and representing the luminance of the same scene point, wherein the first digital value is replaced by a null value, multiplied by a coefficient $N/(N-r)$, where r is the number of pixels of the same rank of the sensor for which the first digital value has been replaced by a null value.

8. The method of claim 1, wherein the sensor comprises N lines with N greater than 2 and the operations of calculation and comparison are performed successively for different pairs of adjacent lines.

9. The method of claim 1, wherein the result of the calculation is an absolute value of the difference between the first digital value and the second digital value.

10. The method of claim 1, wherein the sensor comprises N lines with N greater than 2, wherein the second digital value is a mean value calculated from the N digital values supplied by the pixels of the same rank of the N lines of the sensor and representing the luminance of the same scene point.

11. The method of claim 10, wherein the second digital value is the mean value of the digital values supplied by the pixels of the same rank of the N lines of the sensor excluding the first digital value.

12. The method of claim 10, wherein the fourth value is obtained by replacing the first digital value with the second digital value in the addition of the N digital values from the pixels of the same rank of the N lines of the sensor.

13. The method of claim 1, wherein the fourth value is equal to the sum of the N digital values from the N pixels of the same rank of the N lines of the sensor and representing the luminance of the same scene point, wherein the first digital value is replaced by a null value, multiplied by a coefficient $N/(N-r)$, where r is the number of pixels of the same rank of the sensor for which the first digital value has been replaced by a null value.

14. An active pixel time delay integration image sensor including N lines of photosensitive pixels and enabling the synchronized reading of the same scene strip successively by at least two lines of photosensitive pixels and the pixel by pixel summation of the signals read by the various lines, the image sensor comprising a circuit for digitizing the signal supplied by each pixel and a digital processor circuit configured to perform digital addition of the digital values from the pixels of the same rank belonging to the various lines and having viewed the same scene point, a result of the addition supplied as output representing the light received by the image point, wherein the digital processor circuit is further configured to calculate a difference between a first digital value of the signal from a pixel of a line of the image sensor, representing the luminance of a scene point, and a second digital value from the pixel or pixels of the same rank of at least one other line of the image sensor and representing the luminance of the same scene point, compare the result of the calculation to a threshold, and modify the digital addition and supply in substitution therefor another digital sum not taking the first digital value into account if the result of the calculation exceeds the threshold.

* * * * *